United States Patent
Mikhailov et al.

(10) Patent No.: US 9,025,146 B2
(45) Date of Patent: May 5, 2015

(54) IN-LINE ARRANGEMENT FOR MEASURING POLARIZATION EXTINCTION RATIO

(75) Inventors: Vitaly Mikhailov, Dunellen, NJ (US); Paul S. Westbrook, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 14/236,826

(22) PCT Filed: Aug. 3, 2012

(86) PCT No.: PCT/US2012/049662
§ 371 (c)(1),
(2), (4) Date: Apr. 15, 2014

(87) PCT Pub. No.: WO2013/020121
PCT Pub. Date: Feb. 7, 2013

(65) Prior Publication Data
US 2014/0218733 A1    Aug. 7, 2014

Related U.S. Application Data

(60) Provisional application No. 61/506,632, filed on Aug. 4, 2011.

(51) Int. Cl.
| | |
|---|---|
| *G01J 4/00* | (2006.01) |
| *G01J 4/04* | (2006.01) |
| *G01M 11/00* | (2006.01) |
| *G01J 1/04* | (2006.01) |
| *G02B 6/02* | (2006.01) |
| *G02B 6/024* | (2006.01) |

(52) U.S. Cl.
CPC ............ *G01J 4/04* (2013.01); *G01J 1/0425* (2013.01); *G01M 11/337* (2013.01); *G01M 11/35* (2013.01); *G02B 6/02076* (2013.01); *G02B 6/024* (2013.01)

(58) Field of Classification Search
CPC .......................................... G01J 4/00
USPC ....................................... 356/367
See application file for complete search history.

(56) References Cited

U.S. PATENT DOCUMENTS

| | | | |
|---|---|---|---|
| 6,211,957 B1 * | 4/2001 | Erdogan et al. | 356/364 |
| 6,816,260 B2 * | 11/2004 | Peupelmann et al. | 356/364 |
| 2005/0031245 A1 * | 2/2005 | Law et al. | 385/11 |

*Primary Examiner* — Roy M Punnoose
(74) *Attorney, Agent, or Firm* — Wendy W. Koba, Esq.

(57) ABSTRACT

An in-line polarization extinction ratio (PER) monitor that generates a value of an optical signal's PER from a single measurement, without requiring the optical transmission signal path of the system to be directly coupled into a separate measurement device. The polarization extinction ratio may be defined as: $10 \log(P_{Ex}/P_{Ey})$, where $P_{Ex}$ is the power of the optical signal propagating along the "x axis" and $P_{Ey}$ is the power propagating along the orthogonal "y axis" (with the z-axis defined as a longitudinal optical axis of the system and the x-y plane orthogonal to this direction of propagation). The PER monitor comprises a section of optical fiber (preferably birefringent or with induced birefringency), with a pair of gratings formed along the fiber and oriented to out-couple orthogonal components of the propagating signal. Photodetectors are used to convert the scattered light into electrical signal equivalents and then processed to yield the PER value. By properly aligning the axes of the monitor and the optical system, the two measurements are sufficient to provide a one-shot, real-time calculation of the PER of the optical signal propagating through the system.

20 Claims, 5 Drawing Sheets

IN-LINE ARRANGEMENT FOR MEASURING POLARIZATION EXTINCTION RATIO

CROSS-REFERENCE TO RELATED APPLICATIONS

This application claims the benefit of U.S. Provisional Application No. 61/506,632, filed Aug. 4, 2011 and herein incorporated by reference.

TECHNICAL FIELD

The present invention relates to a technique for measuring the polarization extinction ratio of a propagating optical signal and, more particularly, to an in-line measurement technique that provides a real-time, one-shot measurement of the signal's polarization extinction ratio.

BACKGROUND OF THE INVENTION

Figure 1:
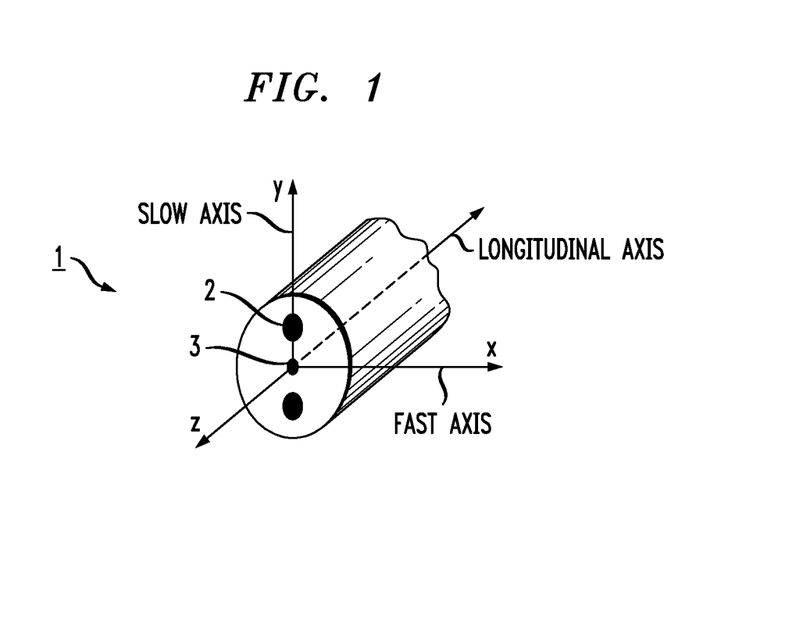
FIG. 1 is an isometric view of an exemplary polarization-maintaining fiber.

Many types of fiber-based communication systems rely on the use of polarization-sensitive components to perform a variety of functions. These components include, but are not limited to, polarization-diversity optical transmitters and receivers, polarization-sensitive optical modulators, amplifiers, lengths of polarization-maintaining (PM) fiber and the like. In order to maintain the polarization integrity of the systems, these components are often interconnected using PM fiber. In particular, PM fiber is optical fiber in which the polarization of linearly polarized light waves launched into the fiber is preserved during propagation, with little or no cross-coupling of optical power between the polarization modes. FIG. 1 is an isometric view of an exemplary section of PM fiber 1, which in this case utilizes stress rods 2 surrounding a core region 3 to create "stress-induced birefringence" and maintain the propagation of a linearly polarized signal along the core. As shown, the x-axis of fiber 1 is denoted as the "fast axis" and the orthogonal y-axis is denoted as the "slow axis", with the optical signal propagating along the longitudinal z-axis. If the polarization of an incoming optical signal is not aligned with the fast (or slow) axis, the output will vary between linear and circular polarization (and generally will be elliptically polarized). The exact polarization will then be sensitive to variations in temperature and stress (including bend-induced stress) in the fiber. Additionally, the polarization maintaining properties of the optical fiber may degrade over time due to environmental effects (e.g., heat, stress, tight bends, etc.).

A good measure of the resulting polarization integrity of an optical signal propagating in such an environment is the "polarization extinction ratio" (or PER), which is a ratio of the power of the optical signal propagating along the "fast axis" with respect to the power of the optical signal propagating along the "slow axis" of the same fiber. Indeed, it is useful to measure the PER in order to correctly launch an incoming (polarized) optical signal into polarization-maintaining components, as well as monitor the ability of the fiber to preserve polarization. In this case, "correctly launch" refers to providing the appropriate alignment of the polarization axes of the signal to the axes of the system. In one form, the PER can be expressed as follows:

$$PER = 10 * \log_{10}(P_{fast\ axis}/P_{slow\ axis}), \quad (1)$$

where, in this particular form, the relationship is measured in decibels (dB). The PER may also be referred to, at times, as the "power splitting ratio", since it is the ratio of power between the fast and slow axes of the optical power in the propagating signal.

In situations where the optical signal is propagating within a non-polarization maintaining optical fiber or waveguide, the PER can be expressed in a similar form and calculated by measuring the power of the optical signal along orthogonal axes.

There are prior art techniques for measuring PER of an optical system, but these techniques require that the system's optical fiber be coupled into a stand-alone device that performs the measurement. This is not always convenient, particularly after a system has been deployed in the field and it is desired to obtain an updated measurement of the signal's PER. Some of these prior art techniques require that a section of optical fiber be stretched or heated; again, this is not always possible. Moreover, these techniques require that a set of measurements be made over time and the PER be calculated from multiple measurements (e.g., as the fiber continues to be heated, measurements are performed at each temperature). Additionally, since a number of separate measurements must be performed over time to calculate the PER, it is not easy to obtain updated measurements—a significant limitation of the prior art.

Thus, a need remains in the art for a means of measuring the PER of an optical signal which does not require termination of the system PM fiber in stand-alone measurement equipment (i.e., takes the form of an "in-line" arrangement), while also able to derive the PER from a single calculation in real time (i.e., an "instantaneous" measure of the polarization extinction ratio).

SUMMARY OF THE INVENTION

The needs remaining in the prior art are addressed by the present invention, which relates to a technique for measuring the polarization extinction ratio of a propagating optical signal and, more particularly, to an in-line measurement technique that provides a real-time, one-shot measurement of the optical signal's polarization extinction ratio.

In accordance with the present invention, an in-line polarization extinction ratio (PER) monitor is proposed that is capable of determining a value of an optical signal's PER from a one-time measurement, without requiring the optical fiber (or other waveguiding means supporting the propagation of the optical signal) of the system to be "disconnected" and applied as an input to a separate, stand-alone measurement device. That is, the inventive PER monitor is an "in-line" device that is directly positioned along the signal path of the system and provides an instantaneous measure of the propagating optical signal's PER without needing to otherwise disrupt the operation of the system.

In a particular embodiment, the PER monitor of the present invention comprises a section of birefringent optical fiber that is directly coupled into the signal path of the system being evaluated. An out-coupling arrangement (such as a pair of gratings or any other suitable light scattering device) is formed along the monitor's optical fiber and used to out-couple components of the propagating signal. Photodetectors are disposed to capture the out-coupled portions of the propagating optical signal and convert the out-coupled light into electrical signal equivalent representations of the optical power along these orientations. These electrical signals are then processed to yield a measure of optical signal power. By properly aligning the axes of the monitor fiber with the propagating optical signal, the pair of electrical signals are sufficient to provide a one-shot, real-time (i.e., instantaneous) determination of the PER of the optical signal propagating through the system.

While a preferred embodiment of the present invention utilizes a birefringent optical fiber as the monitor signal path, it is to be understood that a conventional (i.e., non-birefringent) optical fiber or any other type of optical waveguiding signal path (for example, a planar optical waveguiding structure formed within a substrate, either birefringent or non-birefringent) may be used, including combinations of both fibers and waveguides. In embodiments utilizing a non-birefringent monitor signal path, the out-coupling arrangement is configured to scatter orthogonal polarization components, representing the optical power present along, for example, the x- and y-axes of the signal.

In one embodiment, Bragg gratings may be formed within the PER monitor optical fiber and used to out-couple the light which is then measured by the photodetecting devices. Other arrangements for out-coupling light from a fiber-based PER monitor are contemplated and include, for example, introducing microbends into the fiber, removing a portion of the fiber's cladding to allow for evanescent coupling of the signal from the core (the removal accomplished using a polishing or etching technique, for example), or monitoring light scattered out of the core by acoustic waves traveling along the fiber.

It is possible to include a feedback arrangement between the PER and an optical system, with a control signal output from the PER used to adjust the polarization alignment between selected system components until the desired value of PER is achieved.

It is an advantage of the PER monitor of the present invention that the polarization extinction ratio measurements may continue to be performed over time, with adjustments to polarization alignment between components performed from time to time, as need be, to maintain the desired PER.

While at least two differently-oriented optical signal components need to be out-coupled to determine the PER, additional out-coupling and photodetector pairs may be used in order to increase the accuracy of the resultant PER determination.

A first particular embodiment of the present invention takes the form of a device for providing a determination of a polarization extinction ratio of a propagating optical signal, the device including an optical signal path disposed to receive as an input the propagating optical signal, the optical path, at least two means for out-coupling portions of the propagating optical signal from the optical signal path, photodetecting means disposed to receive the out-coupled portions of the propagating optical signal from the at least two means for out-coupling signals and convert the out-coupled portions into electrical signal representations of the optical power of the out-coupled portions and processing means responsive to the electrical signal outputs from the photodetecting means for determining the polarization extinction ratio value from the electrical signal representations.

Another particular embodiment of the present invention comprises a system for providing real-time measurement of a polarization extinction ratio of a propagating optical signal, the system comprising a polarization-sensitive optical component, optical waveguiding medium coupled to the output of the polarization-sensitive optical component and a polarization extinction ratio monitor disposed along the optical waveguiding medium. The polarization extinction ratio monitor is used for creating a real-time measurement of a polarization extinction ratio of an optical signal exiting the polarization-sensitive optical component and includes an optical signal path coupled to the optical waveguiding medium to receive as an input the output signal from the polarization-sensitive optical component, the optical signal path oriented such that its axes align with the axes of the propagating optical signal, at least two means for out-coupling portions of the propagating optical signal from the optical signal path, photodetecting means disposed to receive the out-coupled portions of the propagating optical signal from the at least two means for out-coupling signals and convert the out-coupled portions into electrical signal representations of the power of the out-coupled portions and processing means responsive to the photodetecting means for determining the polarization extinction ratio based upon the electrical representations from the photodetecting means. It is to be noted that one or more polarization-sensitive components may be disposed in the optical signal path beyond the output of the PER monitor. Indeed, there may be more than one polarization-sensitive optical component at any point along the signal path.

The present invention also discloses a method of determining the instantaneous polarization extinction ratio (PER) of an optical signal propagating along an optical waveguiding medium including the steps of: inserting a PER monitor along the optical waveguiding medium, the PER monitor comprising an optical signal path and at least two out-coupling elements disposed along the optical signal path to out-couple components of the propagating optical signal, with the out-coupled components converted into a pair of electrical signals within a pair of photodiodes and the electrical signals processed to generate the instantaneous PER value; aligning the axes of the PER monitor with the axes of the propagating optical signal; introducing the optical signal into the PER monitor; and calculating the instantaneous PER value associated with the propagating optical signal from the electrical signals created by the pair of photodiodes.

Other and further aspects and advantages of the present invention will become apparent during the course of the following discussion and by reference to the accompanying drawings.

BRIEF DESCRIPTION OF THE DRAWINGS

Referring now the drawings.

DETAILED DESCRIPTION

Figure 2:
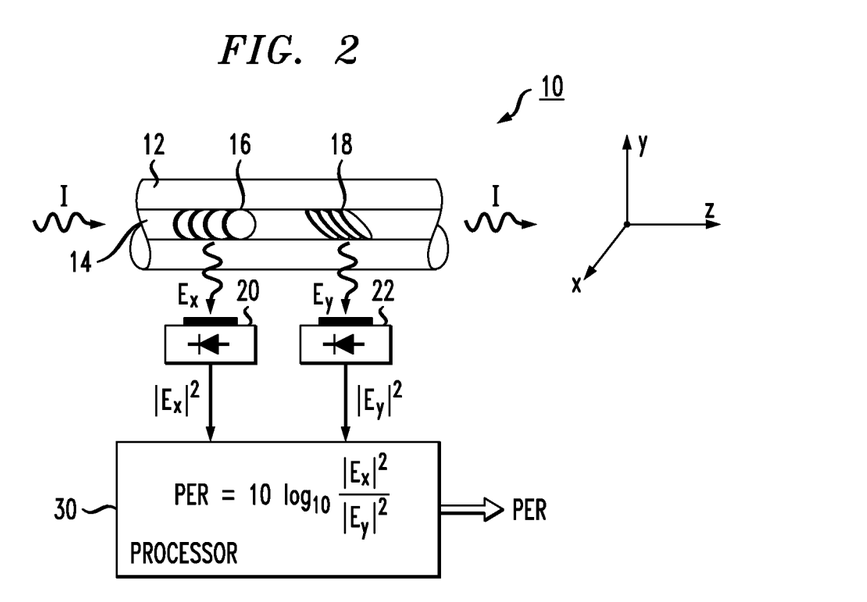
FIG. 2 is a diagram of an exemplary polarization extinction ratio (PER) monitor formed in accordance with the present invention, in this case utilizing a conventional optical fiber and a pair of orthogonally-disposed gratings to perform the optical power measurements used to calculate the PER.

FIG. 2 illustrates an arrangement formed in accordance with the present invention for providing in-line measurement and monitoring of the polarization extinction ratio (PER) of a propagating optical signal. The term "in-line" is taken to mean that the monitor is preferably disposed along the signal path of a given optical system and does not require any disruption of the system's operation or removal of components (such as, for example, an optical fiber used as the transmission medium in the system) in order to perform the PER measurement.

The exemplary PER monitor 10 is shown as comprising a section of optical fiber 12 that includes a core region 14, with an optical signal I coupled into core region 14 and propagating in the manner shown in FIG. 2. As shown in FIG. 2, optical signal I propagates along the longitudinal axis of fiber 12 (denoted as the z-axis), with the x- and y-axes defined as being transverse to optical fiber 12.

Also included in monitor 10 is a pair of elements that functions to out-couple particular polarization states of a polarized optical signal propagating through optical fiber 12. In this particular example, a pair of orthogonally-disposed gratings is used to perform this function, with a first grating 16 oriented to align with the x-axis of optical fiber 12. A second grating 18 is disposed orthogonal to first grating 16. Various techniques well-known in the art can be used to create these grating features such as, for example, introducing periodic changes in the refractive index of core region 14. The optical signal out-coupled by first grating 16, denoted as $E_x$, is intercepted by a first photodetecting device 20 (such as a photodiode). Similarly, the optical signal out-coupled by second grating 18, denoted $E_y$, is intercepted by a second photodetecting device 22. Preferably, first and second photodetecting devices 20 and 22 are well matched (in terms of, for example, responsivity and bandwidth) so that the ultimate PER calculated will be as accurate as possible.

Since first grating 16 is oriented to out-couple a portion of the signal propagating along the x-axis of optical fiber 12, the output signal $|E_x|^2$ from first photodetecting device 20 is representative of the optical power propagating along this axis. Similarly, the output signal $|E_y|^2$ from second photodetecting device 22 is thus representative of the optical power propagating along the y axis. These two electrical signals are applied as inputs to a processor 30 which, among other possible functions, determines the instantaneous value of the optical signal's PER by using equation (1) as defined above. As will be discussed below, processor 30 may also include a look-up table of predetermined PER values associated with various polarization-sensitive components.

At times, Stokes parameters are used to characterize polarization properties of optical signals. For the present purposes of measuring polarization extinction ratio, only two Stokes parameters ($S_0$ and $S_1$) are relevant. The Stokes parameter $S_0$ is associated with the total power of the propagating polarized signal, and the Stokes parameter $S_1$ is associated with the power within the linearly-polarized component of the propagating signal (i.e., $S_1$ is a measure of the "difference" between the horizontal and vertical E-fields of the linearly-polarized signal). In correlating this Stokes nomenclature to the arrangement of the present invention, and presuming that PER monitor 10 is oriented such that the $S_1$ parameter is aligned with the "fast axis" of a PM fiber being measured, the PER calculation can be rewritten as follows:

$$\text{PER} = 10 \, \log\left[\frac{(S_0 + S_1)}{(S_0 - S_1)}\right], \tag{2}$$

since the output from first grating 16 will be a measure of $(S_0+S_1)$ and the output from second grating will be a measure of $(S_0-S_1)$.

Figure 3:
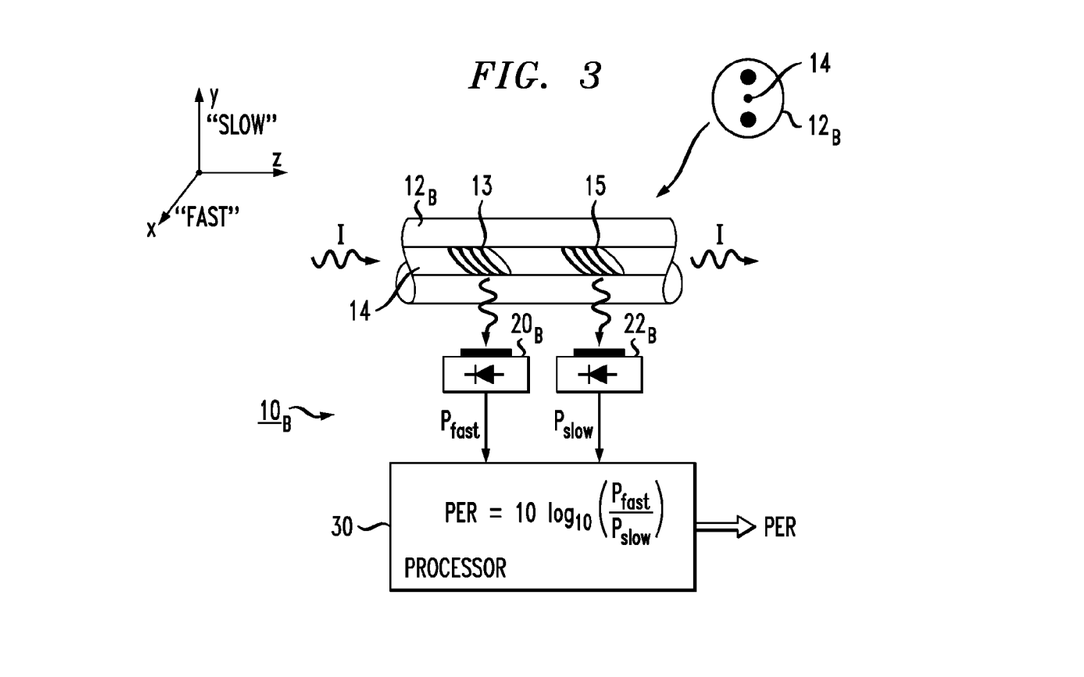
FIG. 3 is a diagram of another embodiment of the present invention, where in this case the polarization extinction ratio (PER) monitor utilizes a birefringent optical fiber and a pair of gratings (not necessarily orthogonally disposed) to perform the optical power measurements used to calculate the PER.

As mentioned above, one preferred embodiment of the present invention uses a section of birefringent optical fiber (or a similarly polarization-maintaining planar optical waveguide) as the PER monitor's signal path. For example, birefringent optical fiber may be preferred when monitoring the PER between a polarization-maintaining laser source and a polarization-maintaining modulator, and it is necessary to verify that the PER is maintained above a predetermined value. FIG. 3 illustrates a PER monitor $10_B$ formed of a section of birefringent optical fiber $12_B$. In one example, birefringent optical fiber $12_B$ may be formed as a stress-induced birefringent fiber, similar to the fiber shown in FIG. 1. Since monitor $10_B$ operates on the same principles of out-coupling at least a pair of optical signals to perform a ratio comparison and determine the signal's PER, a pair of orthogonal measurements aligned with the birefringent axes is preferred in this embodiment. Referring to FIG. 3, a pair of gratings 13 and 15 are shown as disposed along core region.

A pair of photodetectors $20_B$ and $22_B$ are included in PER monitor $10_B$ and disposed to capture the out-coupled signals from gratings 13 and 15, respectively. As with the arrangement of FIG. 2, the electrical signal outputs from photodetectors $20_B$ and $22_B$ are thereafter applied as inputs to processor 30, which generates the PER from a ratio of these two values.

Figure 4:
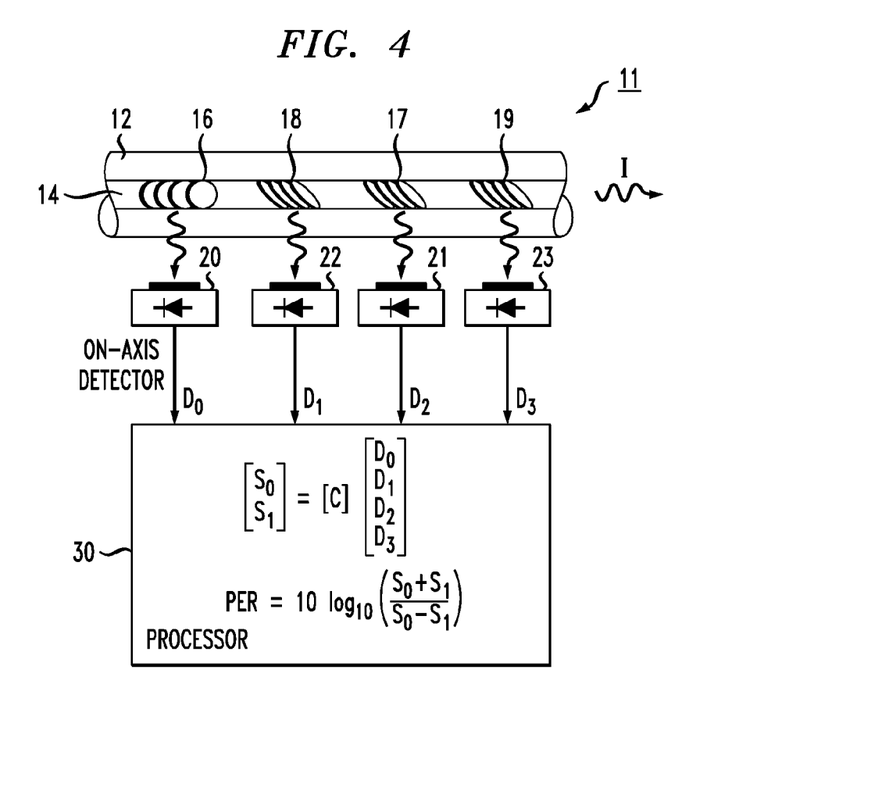
FIG. 4 is a diagram of an alternative embodiment of a PER monitor formed in accordance with the present invention, in this case using a set of four optical power measurements to calculate the PER.

While the arrangements as shown in FIGS. 2 and 3 are acceptable configurations for measuring PER, there are instances where a more precise calculation of PER may be desired. In this case, an arrangement that performs additional measurements may be used, as shown in FIG. 4. In particular, FIG. 4 illustrates a PER monitor 11 of present invention, where elements in common with PER monitor 10 of FIG. 2 carry the same reference number. In this embodiment, PER monitor 11 is shown as including an additional pair of out-coupling devices (in this case, gratings 17 and 19). Accordingly, an additional pair of photodetecting devices 21 and 23 is shown as disposed to capture the optical signal components out-coupled by gratings 17 and 19, respectively. The complete set of four gratings is oriented along core 14 of optical fiber 12 such that each grating out-couples a different polarization state of the propagating signal. As with the embodiments illustrated in FIGS. 2 and 3, it is to be understood that the out-coupling devices utilized within PER monitor 11 may comprise arrangements other than gratings, such as (but not limited to) microbends, side polishing of the fibers or acoustic waves. Further, other types of waveguiding media, such as planar optical waveguides formed within or on a substrate, may be used to form PER monitor 11. In accordance with the principles of the present invention, it is to be understood that optical fiber 12 may comprise a section of birefringent fiber, or non-birefringent fiber or, more generally, any suitable type of optical waveguiding medium, including, for example, planar optical waveguides formed on an appropriate substrate material.

Referring to FIG. 4, the electrical output signals from photodetecting devices 20, 22, 21 and 23 are represented as $D_0$, $D_1$, $D_2$ and $D_3$, respectively, and are applied as separate inputs to processor 30. As mentioned above, the use of two additional measurements improves the accuracy of the calculated PER, where for this example the following relationship may be used to determine the values of $S_0$ and $S_1$:

$$\begin{bmatrix} S_0 \\ S_1 \end{bmatrix} = \begin{bmatrix} C_{00} & C_{01} & C_{02} & C_{03} \\ C_{10} & C_{11} & C_{12} & C_{13} \end{bmatrix} \begin{bmatrix} D_0 \\ D_1 \\ D_2 \\ D_3 \end{bmatrix}. \quad (3)$$

The calibration matrix [C] may be determined by launching a set of "known" polarization signals (i.e., where "S" is known and controlled) through optical fiber 12 and recording the detector values $D_i$ for each polarization. Using optimization schemes (such as disclosed in our co-pending application Ser. No. 13/177,116 filed Jul. 6, 2011 and herein incorporated by reference) the values of calibration matrix [C] can be determined from the known values of [S] and [D]. It is to be noted that the calibration parameters need to be adjusted so that $S_1$ corresponds to the polarization aligned with the axes of the PER monitor (e.g., the "fast" and "slow" axes if the PER monitor is formed of birefringent fiber). In operation, this can be accomplished by adjusting the calibration parameters until an orientation is created such that when light is launched on the x-y axes, the result is that $S_1 = \pm S_0$. Once the values of $S_0$ and $S_1$ are found from the relation of equation (3), the PER value can be calculated as before, using equation (1).

Figure 5:
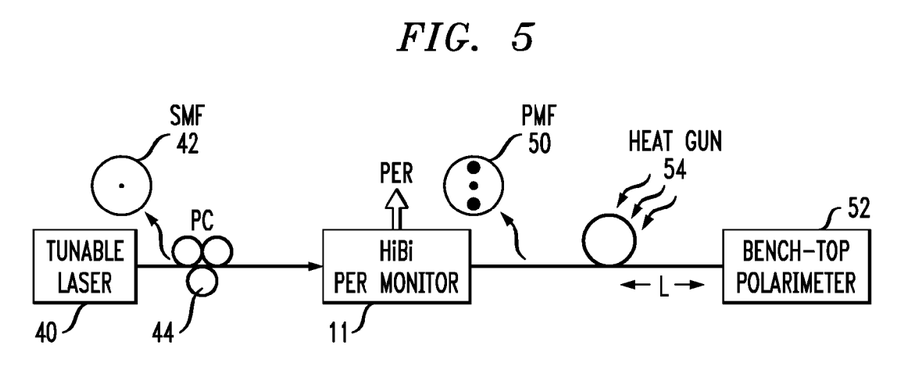
FIG. 5 illustrates a test apparatus utilized to measure the performance of the in-line PER monitor of the present invention against a conventional, prior art bench-top instrument.

The performance of inventive PER monitor 11 has been compared to a conventional, prior art bench top extinction ratio monitor, using the arrangement as shown in the diagram of FIG. 5. In this experiment, a tunable laser source 40 was used to launch an optical signal to be tested into a section of single mode fiber 42. A polarization controller 44 was used to introduce a known, controllable polarization extinction ratio into the optical signal propagating along single mode fiber 42. This propagating signal was then applied as an input to PER monitor 11, which functioned in the manner described above to generate a PER value associated with the polarization state of the propagating signal.

In order to provide a comparison to the prior art measurement techniques, the output from PER monitor 11 was then coupled into a section of PM fiber 50 which was terminated in a conventional polarimeter 52. The signal propagating along PM fiber 50 was treated with a heat gun 54 to introduce perturbations to the temperature of PM fiber 50. By measuring the changes in polarization state as a function of temperature, polarimeter 52 was able to determine the polarization extinction ratio of the propagating optical signal using a conventional prior art method.

Figure 6:
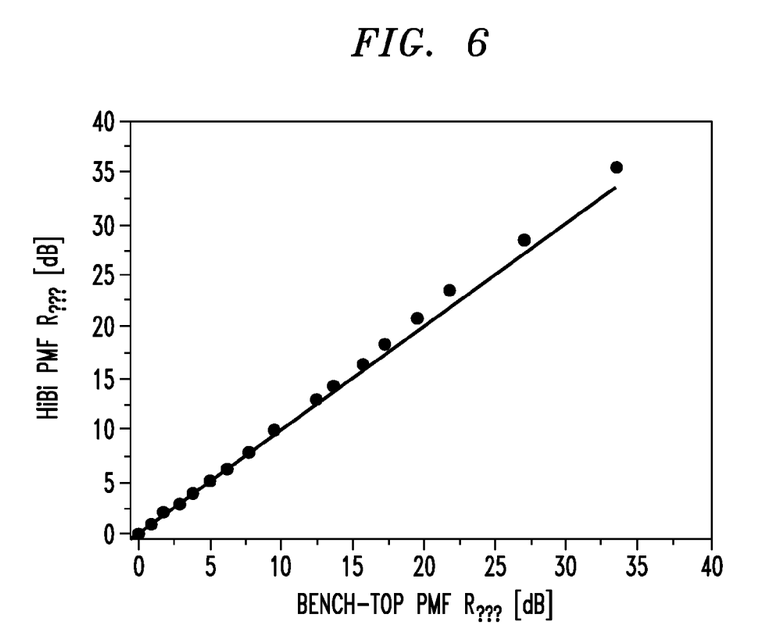
FIG. 6 is a plot comparing the results of testing using the apparatus of FIG. 4.

FIG. 6 is a plot associated with FIG. 5, comparing the results of inventive PER monitor 11 with PER readings derived from conventional polarimeter 52. As shown, up to an extinction ratio of about 30 dB, the maximum deviation of output from monitor 11 with the conventional results was less than 1 dB. The increase in measurement error beyond the 30 dB level may be associated with the available resolution of the electronics associated with the optic-to-electrical conversion within PER monitor 11. Indeed, the variation of the extinction ratio by 5 dB above the 30 dB level corresponds to the variation of the normalized $S_1$ associated with the resolution capabilities of a standard polarimeter.

Figure 7:
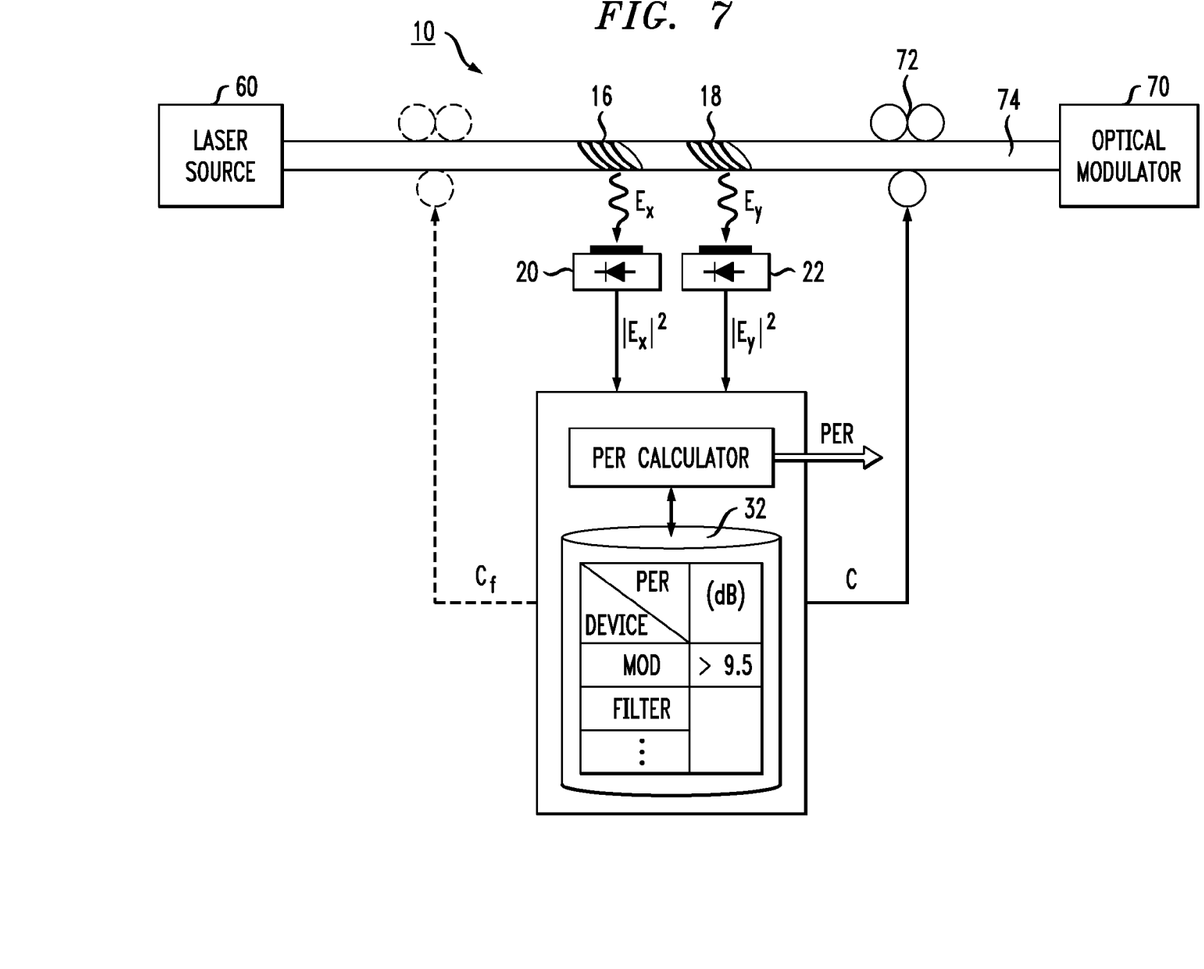
FIG. 7 is a diagram of an exemplary system incorporating the in-line PER monitor of the present invention, including a control signal path for adjusting polarization state as a function of the PER measurement.

As mentioned above, it is important to measure PER in order to correctly launch optical signals into polarization-sensitive components. FIG. 7 illustrates an exemplary system utilizing the in-line PER monitor 10 of the present invention to determine (and thereafter maintain) proper launch conditions between a laser source 60 and a polarization-dependent optical modulator 70. In this case, the system includes a polarization controller 72 disposed between the output of PER monitor 10 and the input to modulator 70. A correction output signal C from monitor 10 is used to adjust the state of polarization controller 72 so as to maintain a desired value of PER at the input to optical modulator 70. When first deployed, monitor 10 is used to initialize the polarization state of the signal entering optical modulator 70 by calculating the PER of the signal exiting laser source 60 and providing an adjustment signal to polarization controller 72 if the PER value is not within a predefined range. Thereafter, ongoing measurements of PER may be used to adjust the polarization state of polarization controller 72 if the measured PER of laser source 60 changes over time (as associated with age, environmental changes, etc.). While the specific embodiment as shown in FIG. 7 utilizes only a single polarization controller 72 disposed at the output of PER monitor 10, it is to be understood that a similar polarization controller may be positioned between laser source 60 and the input to PER monitor 10 (as shown in phantom), with a feedback signal from processor 30 controlling the polarization state of this input polarization controller. Indeed, it is possible to utilize a pair of polarization controllers, positioned both before and after the PER monitor, in order to maintain the PER value within a desired range.

As mentioned above, processor 30 within PER monitor 10 (or monitors $10_B$ and 11) may include a look-up table defining certain PER values (or ranges) associated with specific polarization-dependent components. For example, an acceptable PER value for modulator 70 may be "≥9.5 dB". The value of 9.5 dB may then be stored in table 32 as a threshold PER value for modulator 70. In performing the monitoring function, therefore, as long as the current value of the PER is greater than 9.5, no modification is performed. However, if the PER value goes below 9.5, a control signal C from PER monitor 10 will cause polarization controller 72 to adjust the alignment between optical fiber 74 and the input to modulator 70. Different conditions may cause the alignment to drift over time (for example, aging of the components, environmental changes, changes in laser source, etc.). The ability to perform in-line, real-time readings of the PER at the inputs to components such as an optical modulator is considered to be a significant advance over the state of the art.

Figure 8:
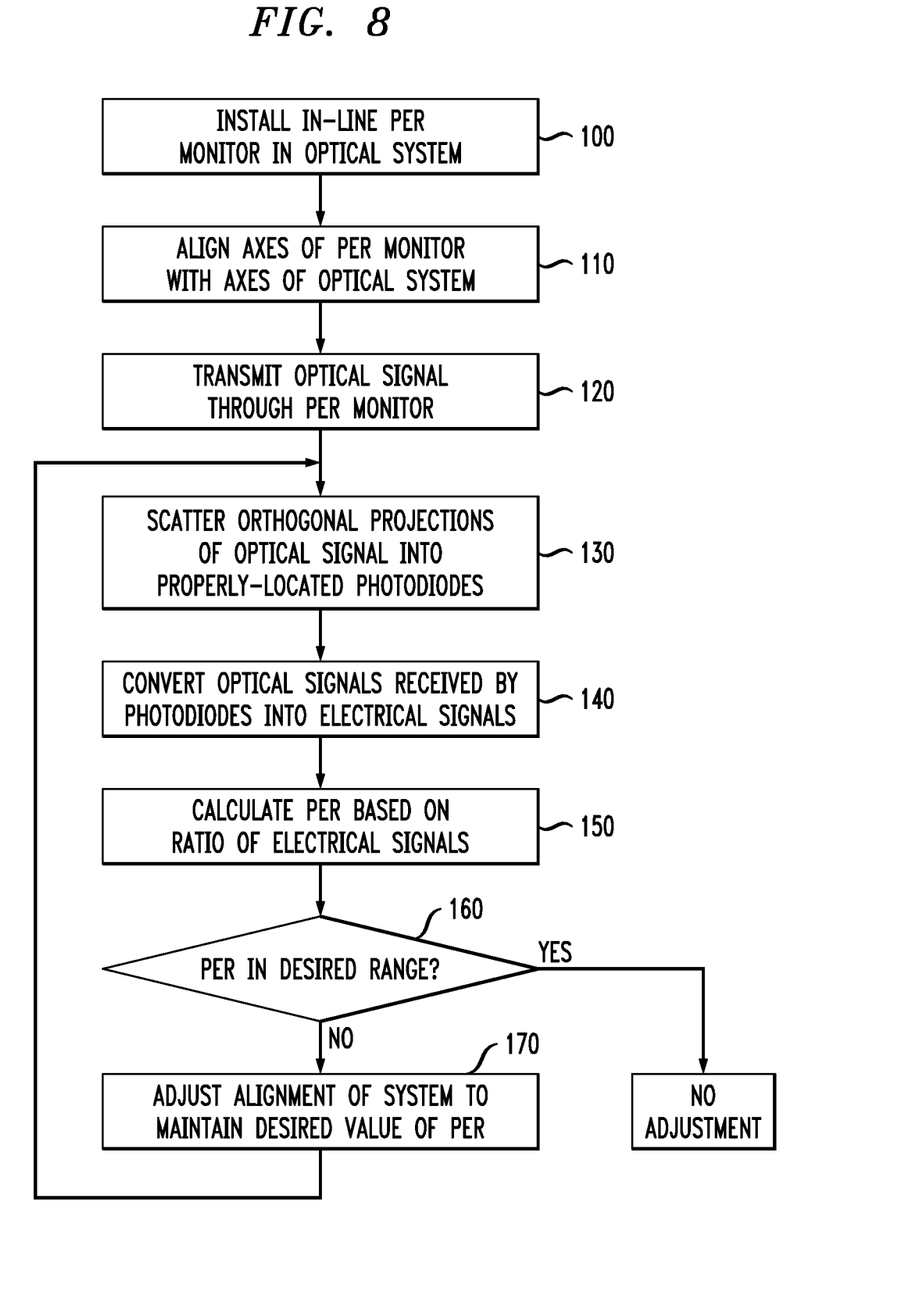
FIG. 8 is a flowchart of an exemplary process of performing polarization extinction ratio measurement in accordance with the present invention.

FIG. 8 is a simplified flow chart illustrating an exemplary method of using the PER monitor of the present invention to control the launch conditions of a propagating optical signal into a polarization-sensitive optical component. As shown, the process begins with providing an in-line PER monitor along a signal path of an optical system (step 100) and aligning the axes of the PER monitor with the axes of the system (step 110). Once alignment is achieved, any PER value calculated by the monitor will thus be equivalent to the PER value experienced by a signal propagating along the associated, aligned PM fiber.

Continuing with the process, an optical signal is coupled into the input of the PER monitor (step 120), and selected portions of the propagating signal are scattered out of the signal path and received by properly-positioned photodetectors (step 130). The photodetectors function to convert the received optical signals into electrical equivalents (step 140)

and a ratio of the values is calculated to determine the instantaneous PER value (step 150).

The instantaneous value is then compared with a predetermined range of values (step 160) and if the PER is within the acceptable range, the process stops. Otherwise, if the measured PER is outside of the desired range, an adjustment in alignment between an optical component and signal path is performed (step 170) and the process returns to step 130.

While this invention has been particularly shown and described with references to preferred embodiments thereof, it will be understood by those skilled in the art that various changes in form and details may be made therein without departing from the scope of the invention encompassed by the appended claims. For example, any means for supporting the propagating of an optical signal (e.g., fibers, planar waveguides, or the like) may be used to form the optical signal path within both the system and the PER monitor. In situations where an optical fiber is used as the signal path within the PER monitor, other means for out-coupling optical signals from the fiber may be used in place of the illustrated Bragg gratings. Additional in-line PER monitors may be disposed in other locations along a polarization-dependent optical system.

What is claimed is:

1. A device for providing a determination of a polarization extinction ratio of a propagating optical signal, the device comprising:
   an optical signal path disposed to receive as an input the propagating optical signal;
   at least two means for out-coupling portions of the propagating optical signal from the optical signal path;
   photodetecting means disposed to receive the out-coupled portions of the propagating optical signal from the at least two means for out-coupling signals and convert the out-coupled portions into electrical signal representations of the optical power of the out-coupled portions; and
   processing means responsive to the electrical signal outputs from the photodetecting means for determining the polarization extinction ratio value using the electrical signal representations.

2. The device as defined in claim 1 wherein the optical signal path comprises a section of optical fiber.

3. The device as defined in claim 2 wherein the at least two means for out-coupling portions of the propagating signal are disposed along the optical signal path in an orthogonal orientation.

4. The device as defined in claim 2 wherein the section of optical fiber comprises a section of birefringent optical fiber having predetermined axes of birefringence.

5. The device as defined in claim 4 wherein the at least two means for out-coupling portions of the propagating optical signal are aligned with the predetermined axes of birefringence.

6. The device as defined in claim 2 wherein the means for out-coupling portions of the propagating optical signal is selected from the group comprising: Bragg gratings, fiber microbends, acoustic waves and side-polished fibers.

7. The device as defined in claim 1 wherein the optical signal path comprises a planar optical waveguide.

8. The device as defined in claim 1 wherein the processing means further comprises a look-up table of predetermined polarization extinction ratios associated with different polarization-sensitive optical components.

9. The device as defined in claim 1 wherein the at least two means for out-coupling portions of the propagating optical signal comprises a pair of means for out-coupling portions of the propagating optical signal.

10. The device as defined in claim 1 wherein the at least two means for out-coupling portions of the propagating optical signal comprises a set of four means for out-coupling portions of the propagating optical signal.

11. A system for providing a measurement of a polarization extinction ratio of a propagating optical signal, the system comprising
    a polarization-sensitive optical component;
    optical waveguiding medium coupled to the output of the polarization-sensitive optical component; and
    a polarization extinction ratio monitor disposed along the optical waveguiding medium for creating a real-time measurement of a polarization extinction ratio of an optical signal exiting the polarization-sensitive optical component, the polarization extinction ratio monitor comprising:
       optical signal path coupled to the optical waveguiding medium to receive as an input the output signal from the polarization-sensitive optical component, the optical signal path oriented such that its axes align with the axes of the propagating optical signal;
       at least two means for out-coupling portions of the propagating optical signal from the optical signal path;
       photodetecting means disposed to receive the out-coupled portions of the propagating optical signal from the at least two means for out-coupling signals and convert the out-coupled portions into electrical signal representations of the power of the out-coupled portions; and
       processing means responsive to the photodetecting means for determining the polarization extinction ratio based upon the electrical representations from the photodetecting means.

12. The system as defined in claim 11 wherein the optical waveguiding medium comprises a section of optical fiber.

13. The system as defined in claim 12 wherein the section of optical fiber forming the optical waveguiding medium comprises a section of birefringent optical fiber.

14. The system as defined in claim 11 wherein the optical signal path of the polarization extinction ratio monitor comprises a section of optical fiber.

15. The system as defined in claim 14 wherein the section of optical fiber forming the polarization extinction ratio monitor signal path comprises a section of birefringent optical fiber having predetermined birefringent axes.

16. The system as defined in claim 15 wherein the at least two means for out-coupling portions of the propagating optical signal are aligned with the birefringent axes of the birefringent optical fiber.

17. The system as defined in claim 11 wherein the optical signal path of the polarization extinction ratio monitor comprises a planar optical waveguide.

18. The system as defined in claim 11 wherein the system further comprises a polarization controller disposed along the optical waveguiding medium, the polarization controller coupled to the processing means of the polarization extinction ratio monitor for providing an adjustment in polarization state to the optical waveguiding medium in response to the polarization extinction ratio output from the processing means.

19. A method of determining the instantaneous polarization extinction ratio (PER) of an optical signal propagating along an optical waveguiding medium, the method comprising the steps of:

inserting a PER monitor along the optical waveguiding medium, the PER monitor comprising an optical signal path and at least two out-coupling elements disposed along the optical signal path to out-couple components of the propagating optical signal, with the out-coupled components converted into a pair of electrical signals within a pair of photodiodes and the electrical signals processed to generate the instantaneous PER value;

aligning the axes of the PER monitor with the axes of the optical waveguiding medium;

introducing the optical signal into the PER monitor; and calculating the instantaneous PER value associated with the propagating optical signal from the electrical signals created by the pair of photodiodes.

20. The method of claim 19 wherein the method further comprises comparing the calculated instantaneous PER value to a predetermined acceptable range of values and, if not in the desired range, modifying the alignment between the optical waveguiding medium and the axes of the PER monitor until the calculated instantaneous PER value is within the acceptable range of values.

\* \* \* \* \*